United States Patent
Cao et al.

(10) Patent No.: US 9,777,032 B2
(45) Date of Patent: Oct. 3, 2017

(54) INJECTION OF A CHEMICAL REAGENT INTO A PROCESS STREAM THAT CONTAINS LIGNIN

(71) Applicant: Cyclewood Solutions, Inc., Fayetteville, AR (US)

(72) Inventors: Nhiem Cao, Fort Smith, AR (US); Kevin Oden, Fayetteville, AR (US)

( * ) Notice: Subject to any disclaimer, the term of this patent is extended or adjusted under 35 U.S.C. 154(b) by 0 days.

(21) Appl. No.: 14/066,669

(22) Filed: Oct. 29, 2013

(65) Prior Publication Data

US 2014/0121360 A1 May 1, 2014

Related U.S. Application Data

(60) Provisional application No. 61/720,334, filed on Oct. 30, 2012.

(51) Int. Cl.
C07G 1/00 (2011.01)

(52) U.S. Cl.
CPC ...................... *C07G 1/00* (2013.01)

(58) Field of Classification Search
CPC ...................................................... C07G 1/00
See application file for complete search history.

(56) References Cited

U.S. PATENT DOCUMENTS

| | | | |
|---|---|---|---|
| 4,017,474 A | 4/1977 | Glasser et al. | |
| 4,803,255 A | 2/1989 | Pruett et al. | |
| 5,512,276 A | 4/1996 | Lang et al. | |
| 5,614,564 A | 3/1997 | Hwang et al. | |
| 5,770,010 A | 6/1998 | Jelks | |
| 6,117,925 A | 9/2000 | Tomka et al. | |
| 6,172,204 B1 | 1/2001 | Sarkanen et al. | |
| 9,156,951 B2 | 10/2015 | Cao et al. | |
| 9,156,952 B2 | 10/2015 | Cao et al. | |
| 9,163,123 B2 | 10/2015 | Cao et al. | |
| 2002/0028857 A1 | 3/2002 | Holy | |
| 2007/0143932 A1 | 6/2007 | Buchert | |
| 2010/0240877 A1* | 9/2010 | Truslowe | 530/500 |
| 2010/0317070 A1 | 12/2010 | Agaskar | |

(Continued)

FOREIGN PATENT DOCUMENTS

| | | |
|---|---|---|
| CA | 1097617 | 3/1981 |
| WO | WO95/25846 | 9/1995 |

(Continued)

OTHER PUBLICATIONS

Wu, L. C.-F., et al., "Engineering plastics from lignin. I. Synthesis of hydroxypropyl lignin," J. Appl. Polym. Sci., 1984, 29, 1111-1123.*

(Continued)

*Primary Examiner* — Nicholas Hill
(74) *Attorney, Agent, or Firm* — Patent Capital Group

(57) ABSTRACT

One example embodiment includes inserting a chemical reagent into a process stream that contains one or more lignins to form one or more modified lignins. The formed one or more modified lignins are different than the one or more lignins in the process stream. The one or more modified lignins can be formed in the process stream before a precipitation stage and then separated from the process stream. Also, contaminates can be removed from the separated one or more modified lignins and the one or more modified lignins can be pressed and dried.

14 Claims, 7 Drawing Sheets

(56) References Cited

U.S. PATENT DOCUMENTS

| | | | |
|---|---|---|---|
| 2011/0071238 A1 | 3/2011 | Bastioli et al. | |
| 2011/0297340 A1* | 12/2011 | Kouisni et al. | 162/16 |
| 2012/0161060 A1 | 6/2012 | Homan et al. | |
| 2014/0121307 A1 | 5/2014 | Cao et al. | |

FOREIGN PATENT DOCUMENTS

| | | |
|---|---|---|
| WO | WO2011/054892 | 5/2011 |
| WO | WO2012/010401 | 1/2012 |
| WO | WO2013/170236 | 11/2013 |
| WO | WO2013/170237 | 11/2013 |
| WO | WO2013/170238 | 11/2013 |
| WO | WO2013/170239 | 11/2013 |
| WO | WO2014/070821 | 5/2014 |
| WO | WO2014/070830 | 5/2014 |

OTHER PUBLICATIONS

Bentivenga, G., et al., "Degradation of steam-exploded lignin from beech by using Fenton's reagent," Biomass and Bioenergy 24 (2003) 233-238.*

Corzan(TM) Industrial Systems—For Industrial Piping Systems in Pulp and Paper Milles, Apr. 2009.*

USPTO Jun. 26, 2014 Final Office Action from U.S. Appl. No. 13/892,228.

USPTO Sep. 15, 2014 Non-Final Office Action from U.S. Appl. No. 13/892,228.

USPTO Aug. 13, 2014 Notice of Allowance from U.S. Appl. No. 13/892,218.

PCT-Nov. 11, 2014 IPRP and Written Opinion of the International Searching Authority from PCT/US2013/040682.

PCT-Nov. 11, 2014 IPRP and Written Opinion of the International Searching Authority from PCT/US2013/040683.

PCT-Nov. 11, 2014 IPRP and Written Opinion of the International Searching Authority from PCT/US2013/040684.

PCT-Nov. 11, 2014 IPRP and Written Opinion of the International Searching Authority from PCT/US2013/040685.

Ciemniecki, et al., "Polymer Blends with Hydroxypropyl Lignin," Chapter 35, ACS Symposium Series, Jul. 31, 1989, pp. 452-463.

Doherty, et al., "Value-adding to Cellulosic Ethanol: Lignin Polymers," Industrial Crops and Products 33 (2011) 259-276; Nov. 19, 2010.

Luo, Feng, et al., "Effects of Compatibilizers on the Mechanical Properties of Low Density Polyethylene/Lignin Blends," Chinese Journal of Polymer Science, Nov. 2009, vol. 27, No. 6, pp. 833-842.

Mariotti, Nicholas, et al., "New Vio-composites Containing Industrial Lignins," Proceedings of the 55th International Convention of Society of Wood Science and Technology, Aug. 27-31, 2012, pp. 1-9.

PCT Dec. 12, 2013 International Search Report from International Application PCT/US2013/040682; 4 pages.

PCT Feb. 24, 2014 International Search Report with Written Opinion from International Application PCT/US2013/067384; 13 pages.

PCT Feb. 5, 2014 International Search Report and Written Opinion from International Application No. PCT/US2013/067401.

Pouteau, et al., "Lignin-Polymer Blends: Evaluation of Compatibility by Image Analysis," C.R. Viologies 327 (Sep. 15, 2004) 935-943.

USPTO Feb. 27, 2014 Non-Final Office Action from U.S. Appl. No. 13/892,227.

USPTO Feb. 28, 2014 Non-Final Office Action from U.S. Appl. No. 13/892,218.

USPTO Feb. 28, 2014 Notice of Allowance from U.S. Appl. No. 13/892,234.

USPTO Mar. 13, 2014 Non-Final Office Action from U.S. Appl. No. 13/892,228.

USPTO May 5, 2014 Final Office Action from U.S. Appl. No. 13/892,218.

USPTO May 7, 2014 Notice of Allowance from U.S. Appl. No. 13/892,227.

U.S. Appl. No. 14/066,666, filed Oct. 29, 2013, entitled "Blending Lignin With Thermoplastics and a Coupling Agent or Compatibilizer," Inventor(s): Nhiem Cao, et al.

U.S. Appl. No. 13/892,218, filed May 10, 2013, entitled "Chemical Modification of Lignin and Lignin Derivatives," Inventor(s): Nhiem Cao, et al.

U.S. Appl. No. 13/892,227, filed May 10, 2013, entitled "Chemical Modification of Lignin and Lignin Derivatives," Inventor(s): Nhiem Cao, et al.

U.S. Appl. No. 13/892,228, filed May 10, 2013, entitled "Chemical Modification of Lignin and Lignin Derivatives," Inventor(s): Nhiem Cao, et al.

U.S. Appl. No. 13/892,234, filed May 10, 2013, entitled "Chemical Modification of Lignin and Lignin Derivatives," Inventor(s): Nhiem Cao, et al.

Ciemniecki, S. L., et al., "Multiphase Materials with Lignin: 1. Blends of Hydroxypropyl Lignin with Poly(methyl methacrylate)," Polymer, Jun. 1988, vol. 29, pp. 1021-1029; © 1988 Butterworth & Co. (Publishers) Ltd.; 9 pages.

De Oliveira, W., et al., "Multiphase Materials with Lignin. 11. Starlike Copolymers with Caprolactonc," Macromolccules 1994, vol. 27, No. 1; © 1994 American Chemical Society; 7 pages.

Fang, Changing, et al., "Characterization of Polypropylene-polyethylene Blends Made of Waste Materials with Compatibilizer and Non-Filler," Composites: Part B: Engineering, vol. 44, Dec. 2013; pp. 498-505; © 2013 Elsevier Ltd. All Rights Reserved.

Glasser, W.G., et al., "Engineering Plastics from Lignin. 11. Characterization of Hydroxyalkyl Lignin Derivatices," Journal of Applied Polymer Science, 1984, vol. 29; © 1984 John Wiley & Sons, Inc.; 16 pages.

Jain, Rajesh K., et al., "Lignin Derivatives; II. Functional Ethers," Holzforschung, vol. 47, No. 4, 1993; pp. 325-332; © Copyright 1993 by Walter de Gruyter-Berlin-New York.

Li, J., et al., "Thermal and Mechanical Properties of Biodegradable Blends of Poly(L-lactic acid) and Lignin," Polymer International 2003, vol. 52, pp. 949-955; May 12, 2003; 7 pages.

Li, Y., et al., "Alkylated Draft Lignin-Based Thermoplastic Blends with Aliphatic Polyesters," Macromolecules 2002, vol. 35, No. 26, pp. 9707-9715; Nov. 21, 2002.

Liu, Zhao, et al., "Extraction of Lignin from Pulping Black Liquor by Organic Acid," Materials Science Forum, vols. 620-622 (2009) pp. 571-574; © 2009 Trans Tech Publications, Switzerland doi: 10.4028/www.scientific.net/MFG.620-622.571.

Lora, Jairo H., et al., "Recent Industrial Applications of Lignin: A Sustainable Alternative to Nonrenewable Materials," Journal of Polymers and the Environment, vol. 10, Nos. 1/2—pp. 39-48; © 2002 Plemum Publishing Corporation.

Marais, Andrew, et al., "Toward an Alternative Compatibilizer for PLA/Cellulose Composites: Grafting of Xyloglucan with PLA," Carbohydrate Polymers, vol. 89, Issue 4, Aug. 1, 2012; pp. 1038-1043; © 2012 Elsevier Ltd. All Rights Reserved.

Pandey, Krishna K., et al.; "Dimensional Stability, UV Resistance, and Static Mechanical Properties of Scots Pine Chemically Modified with Alkylene Epoxides," BioResources, Feb. 10, 2010, vol. 5, No. 2, pp. 598-615.

PCT Aug. 6, 2013 International Search Report and Written Opinion of the International Searching Authority from Application Serial No. PCT/US2013/040685 8 pages.

PCT Aug. 6, 2013 International Search Report and Written Opinion of the International Searching Authority from Application Serial No. PCT/US2013/040683 10 pages.

PCT Sep. 4, 2013 International Search Report and Written Opinion of the International Searching Authority from Application Serial No. PCT/US2013/040684; 11 pages.

Poursorkhabi, Vida, et al., "Extraction of Lignin from a Coproduct of the Cellulosic Ethanol Industry and Its Thermal Characterization," BioResources, vol. 8, Issue 4, Nov. 2013; pp. 5083-5101.

Sahoo, S., et al., "Enhanced Properties of Lignin-Based Biodegradable Polymer Composites Using Injection Moudling Process," Composites: Part A. 201, vol. 42, pp. 1710-1718, Jul. 28, 2011; 9 pages.

(56) References Cited

OTHER PUBLICATIONS

Sailaja, R.R.N., et al., "Mechanical and Thermal Properties of Compatibilized Composites of Polyethylene and Esterified Lignin," Materials and Design, vol. 31, Issue 9, Oct. 2010; pp. 4369-4379; © 2010 Elsevier Ltd. All Rights Reserved.
Tomani, Per, "The Lignoboost Process," Cellulose Chemistry and Technology, vol. 44, No. 1-3 (2010); pp. 53-58.
Wu, Leo C. F., et al., "Engineering Plastics from Lignin. I. Synthesis of Hydroxypropyl Lignin," Journal of Applied Polymer Science, vol. 29, 1111-1123 (Apr. 1984); 13 pages.
Zhang, Ai-Ping, "Extraction, Purification, and Characterization of Lignin Fractions from Sugarcane Bagasse," BioResources, vol. 8, Issue 2, May 2013; pp. 1604-1614.
USPTO Aug. 24, 2015 Non-Final Office Action from U.S. Appl. No. 14/066,666.
USPTO Feb. 25, 2015 Non-Final Office Action from U.S. Appl. No. 14/595,177.
USPTO Feb. 25, 2015 Non-Final Office Action from U.S. Appl. No. 14/595,180.
USPTO Feb. 26, 2015 Non-Final Office Action from U.S. Appl. No. 14/595,182.
U.S. Appl. No. 14/660,918, filed Mar. 17, 2015, entitled "Reactive Extrusion Processes," Inventor: Bernard Robert McKellar.
PCT May 5, 2015 IPRP and Written Opinion of the International Searching Authority from PCT/US2013/067384; 9 pages.
PCT May 5, 2015 IPRP and Written Opinion of the International Searching Aurhority from Application No. PCT/US2013/067401; 8 pages.
IP Australia Aug. 19, 2015 Patent Examination Report No. 1 from Australia Application No. 201337992.

* cited by examiner

INJECTION OF A CHEMICAL REAGENT INTO A PROCESS STREAM THAT CONTAINS LIGNIN

CROSS-REFERENCE TO RELATED APPLICATION

This application claims the benefit of priority under 35 U.S.C. §119(e) to U.S. Provisional Application Ser. No. 61/720,334, entitled "DIRECT INJECTION OF A CHEMICAL REAGENT INTO A PROCESS STREAM THAT CONTAINS LIGNIN" filed on Oct. 30, 2012, which is hereby incorporated by reference in its entirety.

TECHNICAL FIELD

This disclosure relates in general to the field of compositions and, more particularly, to injection of a chemical reagent into a process stream that contains a lignin.

BACKGROUND

Black liquor is a by-product of the papermaking process and is an aqueous solution of lignin residues, hemicellulose, and inorganic chemicals. Typically, the black liquor includes 40-45% soaps, 35-45% lignin, and 10-15% other organics. Lignin is a cross-linked racemic macromolecule with molecular masses in excess of ten thousand unified atomic mass units (10,000 u) and is relatively hydrophobic and aromatic. It is a natural polymer found in plant cell walls and wood, is readily available, relatively inexpensive, and is only less than that of cellulose in overall natural abundance.

Enormous amounts of lignin are produced as byproducts in the pulp and paper industry. In order for lignin to gain wider utilization as an inexpensive and biodegradable/biorenewable material, blends of lignin with thermoplastics are needed with enhanced mechanical and other useful properties. These enhanced properties should exceed those properties predictable by simple rules of mixing of the corresponding blends.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes inserting a chemical reagent into a process stream that contains one or more lignins to form one or more modified lignins. The formed one or more modified lignins are different than the one or more lignins in the process stream. The one or more modified lignins can be formed in the process stream before a precipitation stage and then separated from the process stream. Also, contaminates can be removed from the separated one or more modified lignins and the one or more modified lignins can be pressed and dried.

The chemical reagent may be a compound of inorganic or small organic molecules. In a specific implementation, the chemical reagent may be a Collins reagent, a Fenton's reagent, or a Grignard reagent. The one or more modified lignins can be formed in a storage tank before a precipitation stage (in the processing stream) using hydroxyalkylation, alkylation, acylation, esterification, or etherification. In a specific instance, the one or more modified lignins include hydroxypropyl lignin (HPL). The HPL can be precipitated out by reducing a pH to about a 2 pH.

In an example, the process stream is part of a Kraft pulping process and the chemical reagent can be inserted before the one or more lignins are sent to a recovery furnace. In another example, the process stream is part of a Kraft pulping process and the chemical reagent can be inserted in a pipe leading from evaporators to a recovery boiler. Further, the process stream can be part of a cellulosic ethanol process and a hydroxypropylation reaction may be carried out through the addition of propylene oxide during the formation of the one or more modified lignins.

Example Embodiments

Figure 1:
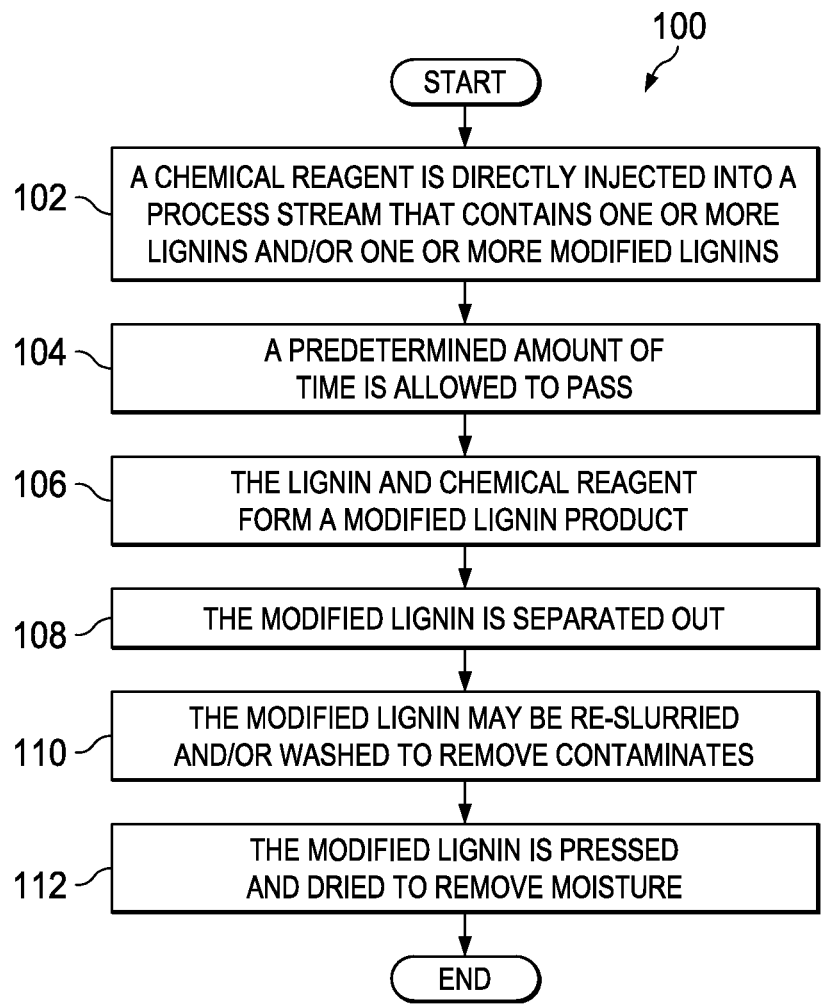
FIG. 1 is a flowchart illustrating potential operations associated with direct injection of a chemical reagent into a process stream in accordance with one embodiment of the present disclosure.

Turning to FIG. 1, FIG. 1 is a simplified flowchart 100 illustrating example activities in accordance with one embodiment of the present disclosure. At 102, a chemical reagent is directly injected into a process stream that contains one or more lignins and/or one or more modified lignins. The term 'lignin' and 'lignins' are meant to encompass a broad category of chemical compounds. For example, the chemical compounds may be derived from wood, secondary cell walls of plants, certain algae, etc. Such materials are encompassed by the broad term lignin and lignins. The term 'chemical reagent' is meant to encompass a substance used in a chemical reaction to detect, measure, examine, or produce other substances. More specifically, the reagent may be a compound or mixture, usually composed of inorganic or small organic molecules, that is used to affect a transformation on a substrate. Examples of organic reagents include the Collins reagent, Fenton's reagent, Grignard reagent, etc. There are also analytical reagents which are used to confirm the presence of another substance. Examples of analytical reagents are Fehling's reagent, Tollens' reagent, etc. Note that 102 may be repeated with additional chemical reagents for multi-stage lignin modifications.

At 104, a predetermined amount of time is allowed to pass. The amount of time allowed to pass is sufficient to allow a chemical reaction to take place. For example, the amount of time may be as little as about three (3) minutes or as long as about forty-eight (48) hours, or any amount of time between about 3 minutes to about 48 hours. However, the amount of time allowed to pass is not limited to between about 3 minutes to about 48 hours and depends on allowing a desired chemical reaction to take place.

At 106, the lignin and chemical reagent form a modified lignin product. In an embodiment, more than one type of modified lignin is formed. At 108, the modified lignin is separated out. For example, the modified lignin may be separated out by precipitation or other separation methods. At 110, the modified lignin may be re-slurried and/or washed to remove contaminants. The contaminants may be anything that makes the modified lignin impure or unclean. Note that this step may not be done or may be done several times. At 112, the modified lignin is pressed and dried to remove moisture. In an embodiment, if a wet form of the lignin is desired, then the modified lignin is not pressed and dried.

For purposes of illustrating certain example techniques of the present disclosure, the following foundational information may be viewed as a basis from which the present disclosure may be properly explained. Enormous amounts of lignin are produced as byproducts of the kraft papermaking process. The structure of the produced lignin is dependent on wood species and processing conditions. Ordinarily, the lignin macromolecular structure is chemically complex and the main monomer units constituting lignin molecules are 2-methoxy-4-propylphenol (guaiacol) in softwood and a mixture of guaiacol and 3,5-dimethoxy-4-propylphenol (syringol) in hardwood. Normally, lignin is extracted from a process stream such as black liquor and then re-dissolved in an alkaline solution before chemical modification.

To reduce the steps necessary for lignin modification, the lignin can be modified while in-stream anywhere before the precipitation stage. In-stream means that the lignin has not been extracted from the process stream. For example, the process stream may include a storage tank and the lignin may be modified while in a storage tank (as described in more detail below). Modifying the lignin in the process stream removes the step of re-dissolving the lignin in an alkaline solution and the subsequent steps of precipitation, filtering, and drying. The modification of the lignin can include, but is not limited to hydroxyalkylation, alkylation, acylation, esterification, etherification, and other similar processes.

In specific embodiments, the process can take advantage of certain chemical conditions present at various steps or stages of the Kraft wood pulping process or similar processes where lignin may be present. For example at process stages where lignin is already dissolved in an alkaline aqueous solution and is furthermore situated at a pH whereby reactive phenolate anion groups may be present, a reagent or reagents can be injected into the process stream in order to react with such phenolate anions and thus form useful chemically-modified lignins.

Figure 2A:
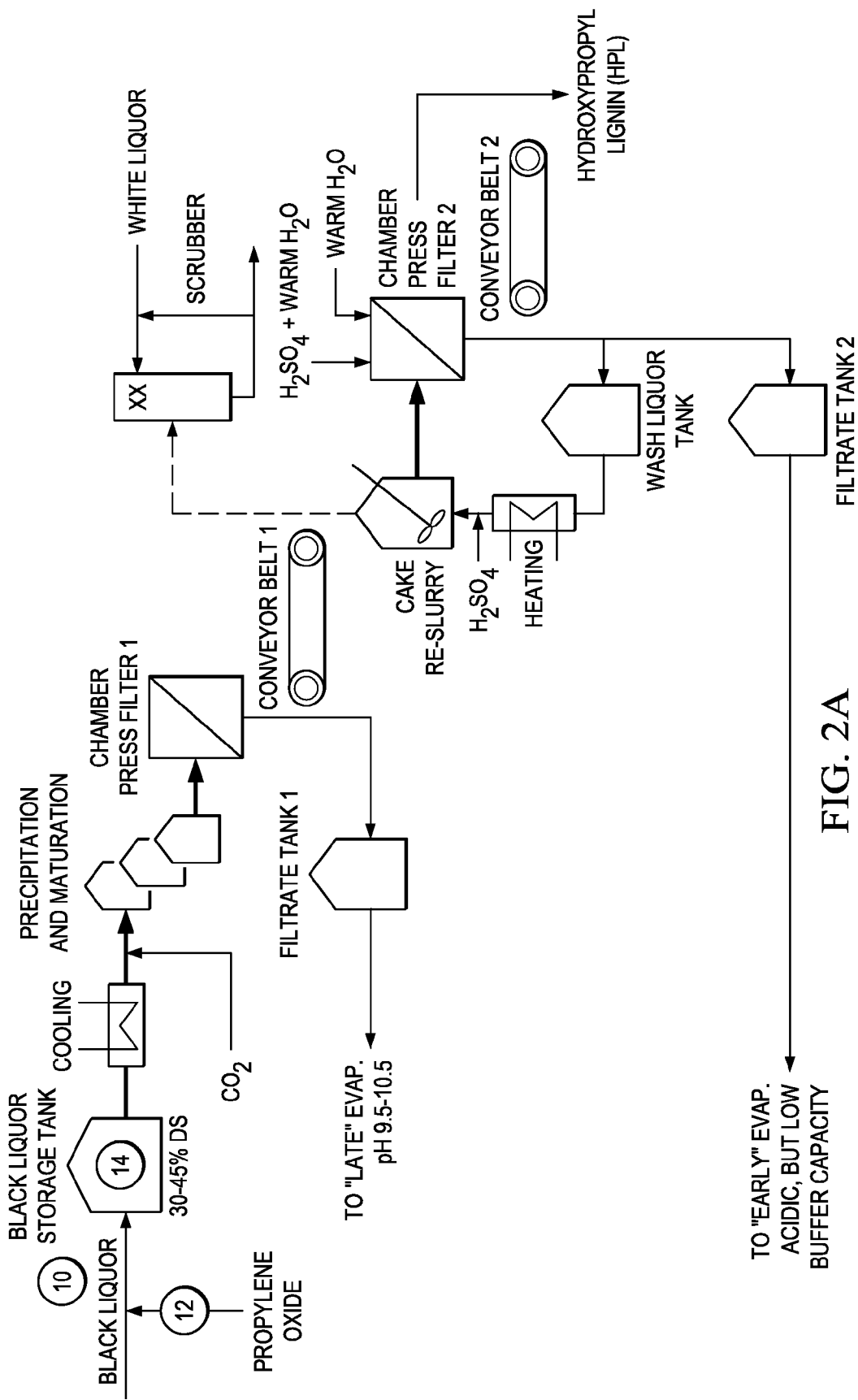
FIG. 2A is a simplified block diagram illustrating possible example details associated with one embodiment of the present disclosure.

Turning to FIG. 2A, FIG. 2A is a simplified block diagram illustrating possible example details associated with one embodiment of direct injection of a chemical reagent into a process stream. FIG. 2A illustrates a process to produce hydroxypropyl lignin (HPL). As shown, a black liquor 10 and propylene oxide 12 are combined in a storage tank 14. In storage tank 14, the lignin in black liquor 10 may be modified. Turbulators, baffles, and/or other mechanical mixing aid may be added in the pipe or storage tank to improve mixing. After modification of the lignin in black liquor 10, the process to produce the modified lignin (e.g., HPL) may continue as illustrated. In an embodiment, chemical reagents to modify the lignin may be inserted into the stream supplying black liquor 10 just prior to black liquor 10 entering storage tank 14. In another embodiment, chemical reagents to modify the lignin may be sprayed or otherwise inserted into storage tank 14 after black liquor 10 and propylene oxide 12 have been inserted into storage tank 14. It should be readily apparent that other means may be used to insert the chemical reagents into storage tank 14 in order to modify the lignin in black liquor 10.

Figure 2B:
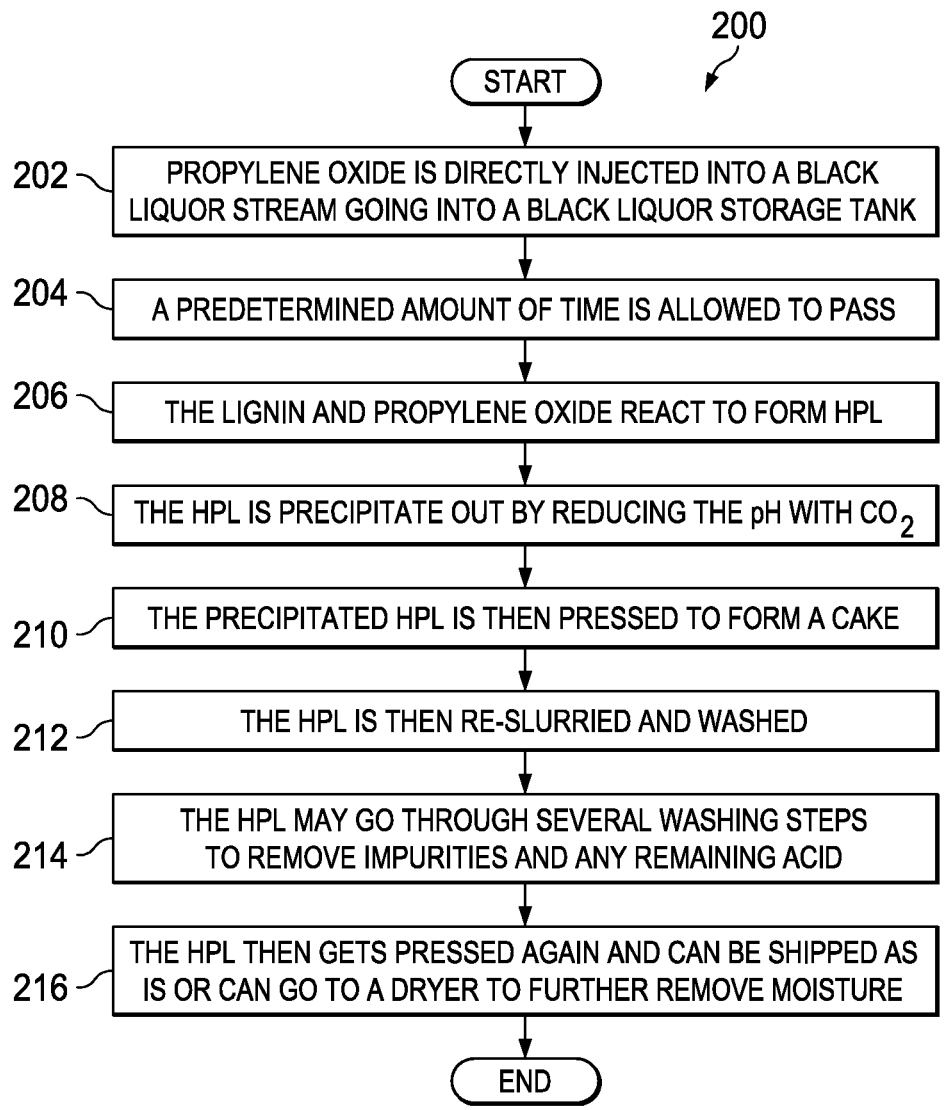
FIG. 2B is a flowchart illustrating potential operations associated with one embodiment of the present disclosure.

Turning to FIG. 2B, FIG. 2B is a simplified flowchart 200 illustrating example activities in accordance with one embodiment of the present disclosure. At 202, propylene oxide is directly injected into a black liquor stream going into a black liquor storage tank. At 204, a predetermined amount of time is allowed to pass sufficient to allow a chemical reaction to occur. For example, the time can be as little as five (5) minutes. In another example, the time may be up to as much as 48 hours. At 206, the lignin and propylene oxide react to form HPL. At 208, the HPL is precipitated out by reducing the pH with $CO_2$. The pH may also be reduced through the addition of an acid, such as hydrochloric acid (HCl) or sulfuric acid ($H_2SO_4$). The HPL should start precipitating once the pH drops below ten (10), but to ensure full precipitation, the pH may be reduced to a pH of about two (2). At 210, the precipitated HPL is then pressed to form a cake. At 212, the HPL is then re-slurried and washed. At 214, the HPL may go through several washing steps to remove impurities and any remaining acid. At 216, the HPL then gets pressed again and can be shipped as is or can go to a dryer to further remove moisture.

Figure 3:
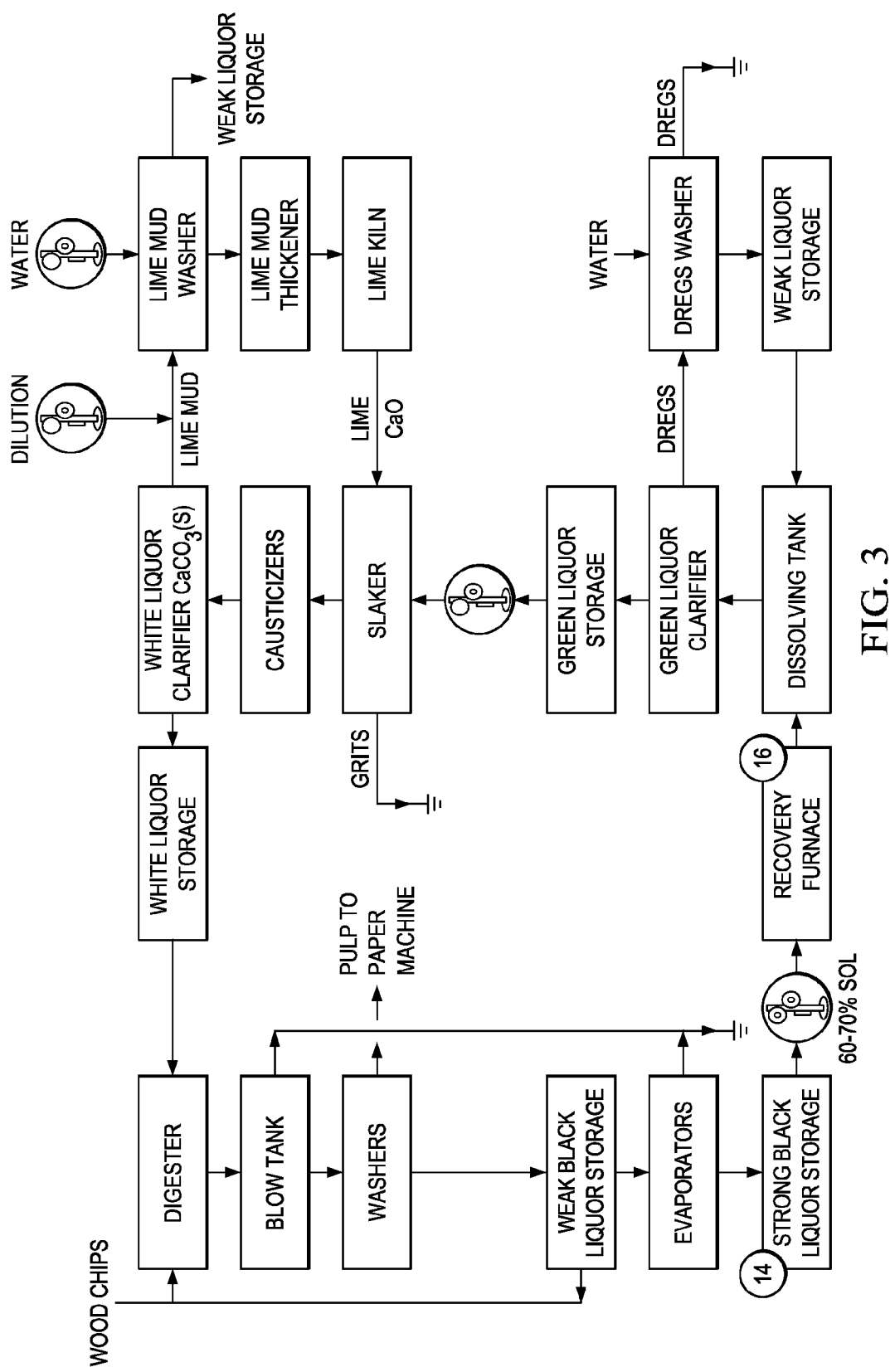
FIG. 3 is a simplified block diagram illustrating possible example details associated with one embodiment of the present disclosure.

Turning to FIG. 3, FIG. 3 is a simplified block diagram illustrating possible example details associated with one embodiment of direct injection of a chemical reagent into a process stream. FIG. 3 illustrates a kraft pulping process where the lignin is modified while in storage tank 14 but before the lignin is sent to a recovery furnace 16. Once the lignin has been modified in storage tank 14, the black liquor stream going to recovery furnace 16 can be diverted to a separation process to remove the modified lignin.

Figure 4:
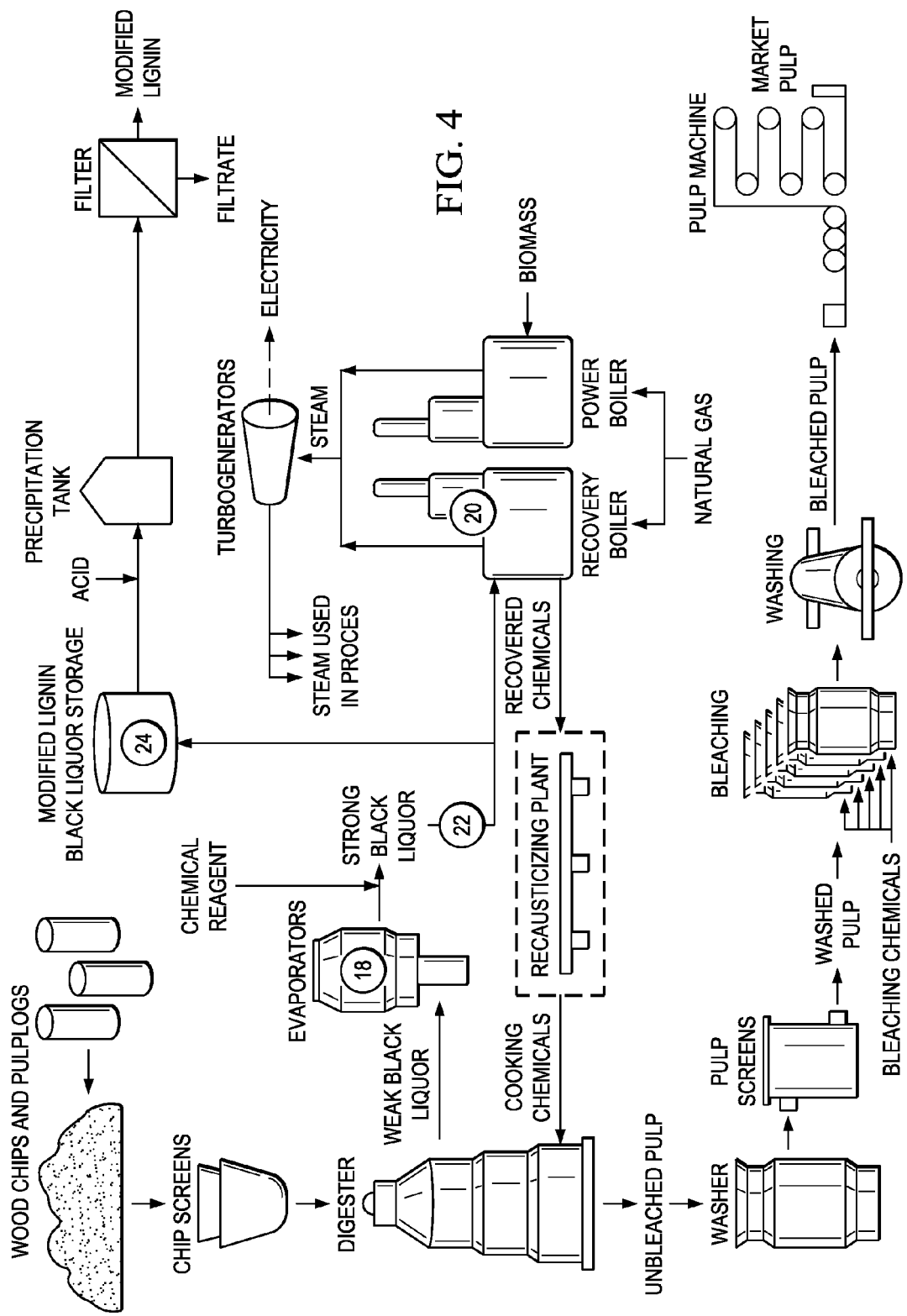
FIG. 4 is a simplified block diagram illustrating possible example details associated with one embodiment of the present disclosure.

Turning to FIG. 4, FIG. 4 is a simplified block diagram illustrating possible example details associated with one embodiment of direct injection of a chemical reagent into a process stream. FIG. 4 illustrates a kraft pulping process where the lignin is modified in a pipe 22 leading from evaporators 18 to a recovery boiler 20. As shown, the chemical reagent is injected into pipe 22, near evaporators 18. The black liquor can be drawn off of the process stream before recovery boiler 20 and stored in a storage tank 24. The modified lignin can then be separated through acid precipitation and subsequent washing and filtering. The filtrate can be sent back to the recovery boiler to recapture pulping chemicals.

Figure 5:
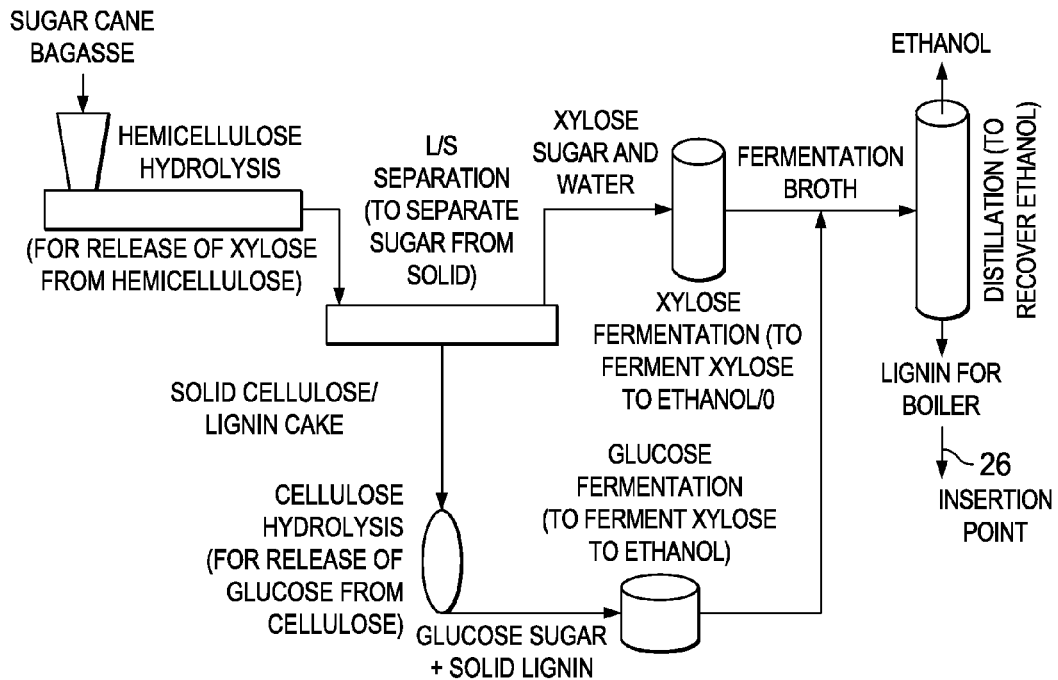
FIG. 5 is a simplified block diagram illustrating possible example details associated with one embodiment of the present disclosure.

Turning to FIG. 5, FIG. 5 is a simplified block diagram illustrating possible example details associated with one embodiment of direct injection of a chemical reagent into a process stream. FIG. 5 illustrates a cellulosic ethanol process for converting sugar cane to ethanol where the lignin is modified after the lignin has been separated from ethanol. Once the lignin is in a lignin separation stream, at insertion point 26, different means may be used to allow a chemical reagent to be inserted into the process stream to modify the lignin. In one embodiment, the pH is adjusted to ensure good reaction conditions (e.g., generally a pH between about 11.5 to about 12.0). Following the pH adjustment, a hydroxypropylation reaction can be carried out through the addition of propylene oxide. A separation process can be used after the propylene oxide addition including a precipitation and filtering step. Washing and drying may be performed depending on the application of the modified lignin (e.g., HPL).

Figure 6:
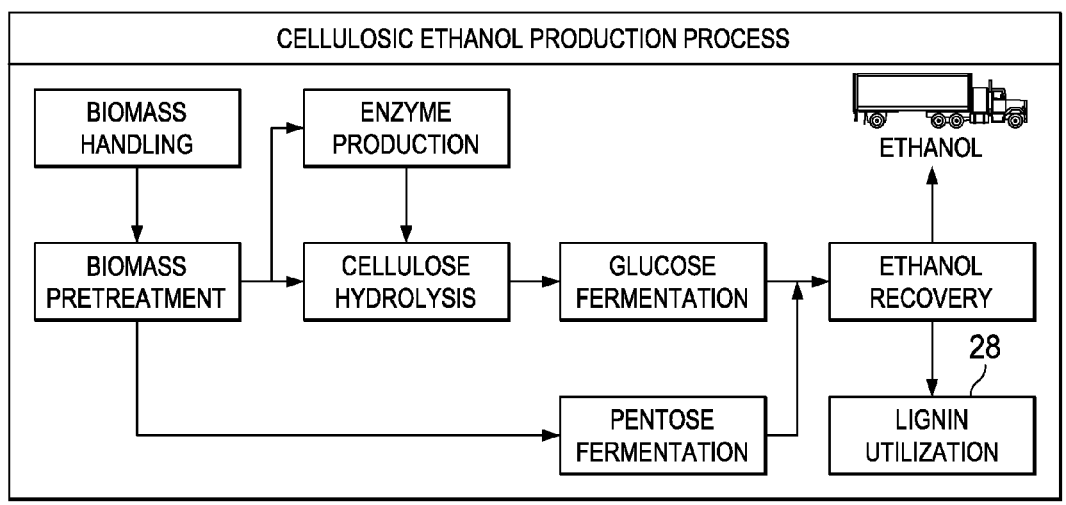
FIG. 6 is a simplified block diagram illustrating possible example details associated with one embodiment of the present disclosure.

Turning to FIG. 6, FIG. 6 is a simplified block diagram illustrating possible example details associated with one embodiment of direct injection of a chemical reagent into a process stream. FIG. 6 illustrates a cellulosic ethanol process where the lignin is modified after the lignin has been separated from ethanol. Once the lignin is in a lignin utilization (or separation) stream 28, different means may be used to allow a chemical reagent to be inserted into the process stream to modify the lignin. In one embodiment, the pH is adjusted to ensure good reaction conditions (e.g., generally a pH between about 11.5 to about 12.0). Following the pH adjustment, a hydroxypropylation reaction can be carried out through the addition of propylene oxide. A separation process, including a precipitation and filtering step, can be performed after the propylene oxide addition. Washing and drying may be performed depending on the application of the modified lignin (e.g., HPL).

Figure 7:
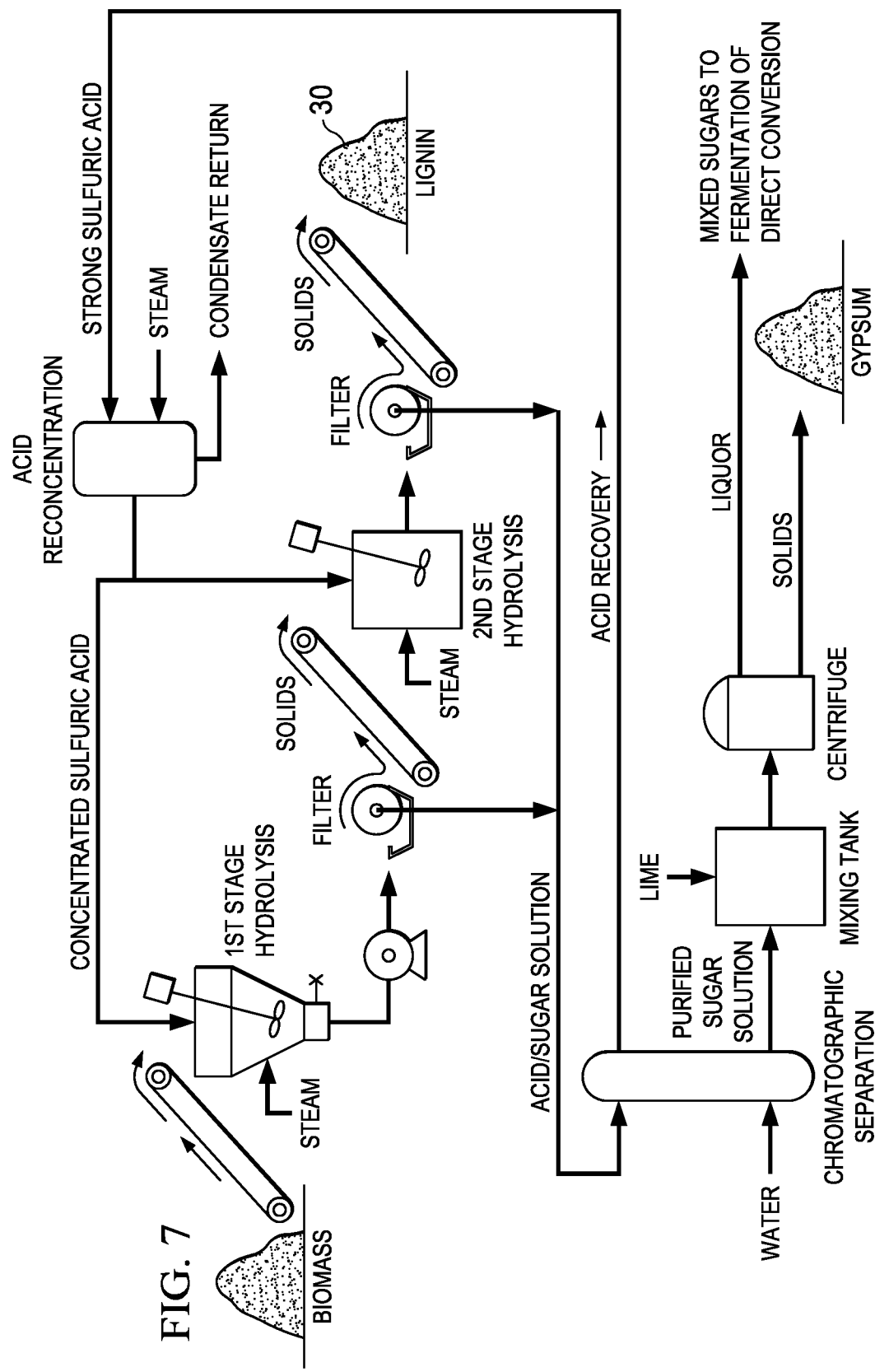
FIG. 7 is a simplified block diagram illustrating possible example details associated with one embodiment of the present disclosure.

Turning to FIG. 7, FIG. 7 is a simplified block diagram illustrating possible example details associated with one embodiment of direct injection of a chemical reagent into a process stream. FIG. 7 illustrates a solid lignin 30 in the process stream. Even though the lignin is a solid, it is still considered in the process stream because the lignin contains contaminates and other constituents and is not purified lignin. The modification of the solid lignin shown in FIG. 7 may take place while the lignin is being stored in the solid form or could occur during transport (e.g., by truck, railcar, etc.). In one embodiment, the lignin stream is dissolved in an alkali solution with a pH above about 12.0. The pH is then adjusted to between about 11.5 and about 12.0 for good conditions to allow hydroxypropylation. Following the pH adjustment, a hydroxypropylation reaction can be carried out through the addition of propylene oxide. A separation process can be placed after the propylene oxide addition including a precipitation and filtering step. The dissolution of the lignin stream and subsequent precipitation of HPL acts as a purification step, as well as a precipitation step. Washing and drying may be performed depending on the application of the modified lignin (e.g., HPL).

Note that many of the compositions, materials, percentages, etc. discussed herein could readily be changed, modified, altered, or substituted with different materials without departing from the teachings of the present disclosure. It is similarly imperative to note that the operations and steps described with reference to the preceding FIGURES illustrate only some of the possible scenarios that may be executed by, or within, the systems of the present disclosure. Some of these operations may be deleted or removed where appropriate, or these steps may be modified or changed considerably without departing from the scope of the discussed concepts. In addition, the timing of these operations may be altered considerably and still achieve the results taught in this disclosure. The preceding discussions have been offered for purposes of example and discussion. Substantial flexibility is provided by the system in that any suitable arrangements, chronologies, configurations, and timing mechanisms may be provided without departing from the teachings of the discussed concepts. Along similar lines, the ranges (e.g., with respect to timing, temperature, concentrations, etc.) could be varied considerably without departing from the scope of the present disclosure.

Note that with the examples provided above, interaction may be described in terms of two, three, or four elements. However, this has been done for purposes of clarity and example only. In certain cases, it may be easier to describe one or more of the functionalities of a given set of flows by only referencing a limited number of elements. It should be appreciated that the examples described (and their teachings) are readily scalable and, further, can accommodate a large number of components, as well as more complicated/sophisticated arrangements and configurations. Accordingly, the examples provided should not limit the scope or inhibit the broad teachings as potentially applied to a myriad of other architectures.

It is also important to note that the steps in the preceding flows illustrate only some of the possible scenarios that may be executed or preformed. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   inserting a chemical reagent into a process stream from evaporators to a recovery boiler, wherein the process stream includes one or more lignins, wherein the one or more lignins form one or more modified lignins within the process stream without being physically separated or removed from the process stream, wherein the one or more modified lignins are formed using hydroxyalkylation, alkylation, acylation, esterification, or etherification, wherein the one or more modified lignins are different than the one or more lignins in the process stream; and
   separating the one or more modified lignins from the process stream before the process stream reaches the recovery boiler.

2. The method of claim 1, wherein the one or more modified lignins are formed in the process stream before a precipitation stage.

3. The method of claim 1, further comprising:
removing contaminates from the separated one or more modified lignins.

4. The method of claim 1, further comprising:
pressing and drying the separated one or more modified lignins.

5. The method of claim 1, wherein the chemical reagent is a compound of inorganic or small organic molecules.

6. The method of claim 1, wherein the one or more modified lignins include hydroxypropyl lignin.

7. The method of claim 6, wherein the hydroxypropyl lignin is precipitated out by reducing a pH to about a 2 pH.

8. The method of claim 1, wherein the chemical reagent is inserted before the one or more lignins are sent to a recovery furnace.

9. The method of claim 1, wherein the chemical reagent is inserted into the process stream using a pipe, wherein the pipe is located at a position along the process stream leading from the evaporators to the recovery boiler.

10. The method of claim 1, wherein the chemical reagent is inserted into the process stream using a pipe, wherein the pipe is located at a position along the process stream and the process stream is a process stream that has a velocity.

11. The method of claim 1, wherein the process stream is part of a cellulosic ethanol process and a hydroxypropylation reaction is carried out through the addition of propylene oxide during the formation of the one or more modified lignins.

12. The method of claim 1, wherein the process stream is part of a Kraft pulping process.

13. A method, comprising:
accessing a process stream from evaporators to a recovery boiler, wherein the process stream includes one or more lignins;
inserting a chemical reagent into the process stream before a precipitation stage of the process stream; and
forming one or more modified lignins within the process stream using hydroxyalkylation, alkylation, acylation, esterification, or etherification and without being physically separated or removed from the process stream, wherein the one or more modified lignins are different than the one or more lignins in the process stream, wherein the one or more modified lignins include hydroxypropyl lignin.

14. The method of claim 13, wherein the process stream is part of a Kraft pulping process.

\* \* \* \* \*